United States Patent Office.

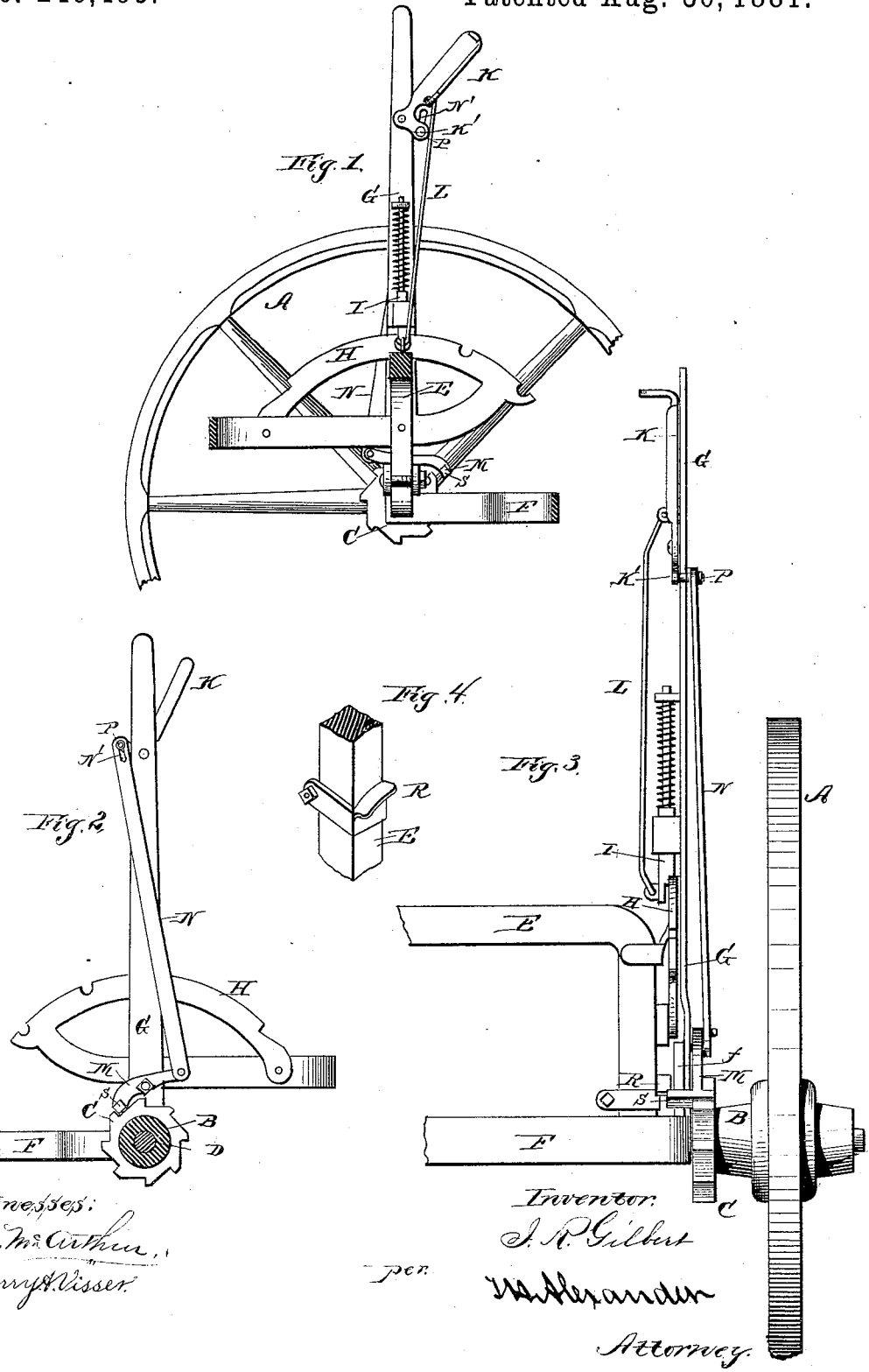

ISAAC R. GILBERT, OF CHARLESTOWN, INDIANA.

SULKY-PLOW.

SPECIFICATION forming part of Letters Patent No. 246,495, dated August 30, 1881.

Application filed April 19, 1881. (Model.)

*To all whom it may concern:*

Be it known that I, ISAAC R. GILBERT, of Charlestown, in the county of Clark and State of Indiana, have invented certain new and useful improvements in Sulky-Plows; and I do hereby declare that the following is a full, clear, and exact description thereof, reference being had to the accompanying drawings and to the letters of reference marked thereon, which form part of this specification.

My present invention relates to that class of sulky-plows in which means are employed for locking the wheel of the sulky to cause the draft of the team to raise the plow from the ground and the automatic unlocking of the wheel when the plow is sufficiently elevated.

The main object of the improvement is to provide self-lifting devices for elevating the plow; and to such end I construct and combine certain devices, as hereinafter described, and specifically pointed out in the claims.

In the drawings, which represent only so much of a sulky-plow as will be requisite to illustrate my invention, Figure 1 is a vertical section of my invention; Fig. 2, a side elevation, with the wheel-hub in section; Fig. 3, a rear elevation, and Fig. 4 a detail view of the incline.

Let A indicate one of the supporting-wheels of the sulky, and B its hub, upon the inner end of which will be rigidly secured a ratchet-wheel, C. The inner end of the axle D, that passes through the hub, is either secured to or formed with the arch E, which extends across the sulky, and is provided at its opposite end with a similar axle.

F indicates a bail, to which the plow will be attached. This bail is hung upon the axle between the arch and the hub, so as to swing freely thereon. It is provided with an arm, $f$, to which is rigidly secured the lever G, which will be grasped by the operator for the purpose of lowering the bail and the plow that is attached thereto.

Upon the arch is secured a rack-segment, H, and upon the lever is arranged a spring-latch, I, for engaging said rack.

The latch-lever K is pivoted to the long lever G, and connects with the latch by means of a rod, L, which is connected with the latching-lever at a point above the pivot of the latter.

M indicates a pawl that is adapted to engage the ratchet upon the wheel-hub. This pawl is pivoted to the long lever G, and connects with the short arm K' of the latch-lever through the medium of a connecting-rod, N, that is pivoted at its lower extremity to an arm of the pawl, and provided at its upper end with a slot, N', to receive a wrist-pin, P, upon the short arm of the latch-lever. This slot in the connecting-rod is of such length that the latch-lever can be operated to disengage the latch from the rack-segment without causing the short arm of the latch-lever to act upon the connecting-rod, so as to raise the same and thereby throw the pawl into engagement with the ratchet upon the hub. When the latch, however, is thus raised, the wrist-pin which plays in the slot of the connecting-rod will be at the upper terminus of the slot, so that a continuance of the movement of the latch-lever will cause its short arm to act upon the connecting-rod.

R indicates an adjustable incline upon one of the ends of the arch, said incline being formed by means of a collar adjustably secured upon said arch, and having one of its edges made inclined, as shown. This adjustable incline is for disengaging the pawl from the ratchet upon the hub in the manner presently described, and to effect such at the proper time the pawl is provided with a pin or stud, S, arranged to strike the said incline.

The operation is as follows: To lower the bail and the plow the operator grasps the long lever and the latching-lever, and by bringing the latter parallel with the former the latch will be freed from the rack-segment, after which the plow can be let down and the latch transferred to another notch. To raise the plow the operator will bring the two levers parallel, as before, and then by continuing the movement of the latch-lever, so as to throw it beyond the long lever, to which it is pivoted, the pin upon the short arm of the latch-lever will act against the connecting-rod at the upper terminus of the slot so as to raise said rod and hence actuate the pawl and bring the same into engagement with the ratchet upon the hub. By now turning the wheel the bail and the plow will be raised until the pin or stud upon the pawl strikes against the incline upon the arch, at which moment the pawl will be raised from engagement with the ratchet, and, the parts being released, the latch-lever will fly back and the latch spring into engagement with the rack-segment.

I am aware that it is not new in wheel-plows to lock the wheel for raising the plow by the draft, nor to automatically unlock it when the plow has been raised, and this I do not broadly claim.

What I claim, and desire to secure by Letters Patent, is—

1. The combination, in a sulky-plow, of an adjustable incline arranged upon the arch, with pawl M, having pin or stud s, ratchet-wheel C, and lever G, all substantially as and for the purpose set forth.

2. The combination, in a sulky-plow, of arch E, bail F, and incline or lifting device R with ratchet C, lever G, pawl M, and connecting-rods L N, all arranged to operate substantially as herein set forth.

3. The combination, in a sulky-plow, of the rack-segment H, spring-latch I, lever G, latch-lever K, rod L, which rod is connected with latch-lever at a point above its pivot, slotted connecting-rod N, pawl M, and ratchet C, all arranged to operate as herein set forth.

In testimony that I claim the foregoing as my own I affix my signature in presence of two witnesses.

ISAAC R. GILBERT.

Witnesses:
MITCHEL P. ALPHA,
SOLON YOUNG.